United States Patent
Chi et al.

(10) Patent No.: US 12,366,774 B2
(45) Date of Patent: Jul. 22, 2025

(54) BACKLIGHT MODULE, AND DISPLAY DEVICE AND DRIVING METHOD THEREOF

(71) Applicants: Beijing BOE Display Technology Co., Ltd., Beijing (CN); BOE Technology Group Co., Ltd., Beijing (CN)

(72) Inventors: Weining Chi, Beijing (CN); Rui Han, Beijing (CN); Daekeun Yoon, Beijing (CN); Qing Ma, Beijing (CN); Dong Cui, Beijing (CN); Zhipeng Zhang, Beijing (CN); Fengping Wang, Beijing (CN); Yue Zhai, Beijing (CN); Wenyang Li, Beijing (CN); Yongle Qi, Beijing (CN); Shouyang Leng, Beijing (CN); Biqi Li, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/271,700

(22) PCT Filed: Jul. 27, 2022

(86) PCT No.: PCT/CN2022/108303
§ 371 (c)(1),
(2) Date: Jul. 11, 2023

(87) PCT Pub. No.: WO2024/020872
PCT Pub. Date: Feb. 1, 2024

(65) Prior Publication Data
US 2025/0076704 A1    Mar. 6, 2025

(51) Int. Cl.
*G02F 1/13357*    (2006.01)

(52) U.S. Cl.
CPC .. *G02F 1/133605* (2013.01); *G02F 1/133603* (2013.01)

(58) Field of Classification Search
CPC ............... G02F 1/133603; G02F 1/133605
See application file for complete search history.

(56) References Cited

U.S. PATENT DOCUMENTS 12,025,880 B2 *   7/2024   Hashimoto ....... G02F 1/133608
2009/0244903 A1   10/2009  Wong et al.
(Continued)

FOREIGN PATENT DOCUMENTS

CN    200953347 Y    9/2007
CN    102087004 A    6/2011
(Continued)

*Primary Examiner* — Keith G. Delahoussaye
(74) *Attorney, Agent, or Firm* — WHDA, LLP

(57) ABSTRACT

A backlight module, and a display device and a driving method thereof, which relate to the technical field of displaying. The backlight module includes a substrate, and a plurality of light sources and a plurality of reflector cups arranged at one side of the substrate; each reflector cup includes a lower port, an upper port, a cup body connected between the lower port and the upper port, and a plurality of micro structures arranged on an inner wall surface of the cup body; the plurality of light sources are separately located at the lower ports of the different reflector cups; and light-emitting surfaces of the light sources face the upper ports; the micro structures have a plurality of reflecting surfaces: the reflecting surfaces are configured for reflecting light emitted by the light sources.

16 Claims, 9 Drawing Sheets

(56) References Cited

U.S. PATENT DOCUMENTS

| | | |
|---|---|---|
| 2011/0134644 A1 | 6/2011 | Foo |
| 2014/0104885 A1* | 4/2014 | Zhang .................. G02B 5/0242 |
| | | 362/625 |
| 2019/0094616 A1* | 3/2019 | Kim ..................... G02B 6/0051 |
| 2019/0094620 A1 | 3/2019 | Harada et al. |
| 2019/0113208 A1 | 4/2019 | Chan et al. |
| 2021/0302785 A1 | 9/2021 | Nam et al. |
| 2023/0314873 A1* | 10/2023 | Shibai ............... G02F 1/133605 |
| | | 362/97.1 |

FOREIGN PATENT DOCUMENTS

| | | |
|---|---|---|
| CN | 204387961 U | 6/2015 |
| CN | 109654404 A | 4/2019 |
| CN | 211826834 U | 10/2020 |
| CN | 113448122 A | 9/2021 |
| CN | 113823235 A | 12/2021 |

* cited by examiner

| Angle | Brightness (10000 nits) | Uniformity |
|---|---|---|
| 140° | 141 | 63% |
| 150° | 142 | 71% |
| 160° | 158 | 72% |
| 170° | 180 | 84% |

BACKLIGHT MODULE, AND DISPLAY DEVICE AND DRIVING METHOD THEREOF

TECHNICAL FIELD

The present disclosure relates to the technical field of displaying and, more particularly, to a backlight module, and a display device and a driving method thereof.

BACKGROUND

A backlight module is a component that provides a light source for a liquid crystal display panel from a back surface. A liquid crystal display device can normally display a picture by using a backlight module.

SUMMARY

The present disclosure provides a backlight module, including: a substrate, and a plurality of light sources and a plurality of reflector cups arranged at one side of the substrate;
 wherein each reflector cup includes a lower port, an upper port, a cup body connected between the lower port and the upper port, and a plurality of micro structures arranged on an inner wall surface of the cup body;
 the plurality of light sources are separately located at the lower ports of different reflector cups, and light-emitting surfaces of the light sources face the upper ports;
 the micro structures have a plurality of reflecting surfaces, the reflecting surfaces are configured for reflecting light emitted by the light sources, and normal directions of at least two reflecting surfaces in the micro structures and a normal direction of the inner wall surface of the cup body covered by the micro structures are different from one another.

In an optional embodiment, the plurality of reflecting surfaces include a first reflecting surface and a second reflecting surface; the first reflecting surface and the second reflecting surface share a same edge; and the same edge is an edge of the first reflecting surface and the second reflecting surface away from the inner wall surface of the cup body.

In an optional embodiment, the same edge is perpendicular to a boundary of the lower port or the upper port.

In an optional embodiment, an angle between the first reflecting surface and the second reflecting surface is greater than or equal to 900 and less than 180°; and/or, a length of the same edge is greater than or equal to 0.2 mm and less than or equal to 2 mm.

In an optional embodiment, the plurality of reflecting surfaces include a third reflecting surface and a fourth reflecting surface; the third reflecting surface and the fourth reflecting surface share a same vertex; and the same vertex is a vertex of the third reflecting surface and the fourth reflecting surface away from the inner wall surface of the cup body.

In an optional embodiment, the micro structures are raised structures or sunken structures arranged on the inner wall surface of the cup body.

In an optional embodiment, the plurality of micro structures are arranged closely and/or are arranged in an array on the inner wall surface of the cup body.

In an optional embodiment, the inner wall surface of the cup body includes at least one of the following: a plane, a polygonal surface, a paraboloid, a Bezier curved surface, a cylindrical surface, a conical surface, and a spherical surface.

In an optional embodiment, the inner wall surface of the cup body includes a curved surface protruding away from one side of an internal space of the reflector cup.

In an optional embodiment, the inner wall surface of the cup body includes a curved surface; a curvature of the curved surface sequentially changes in a first direction; and the first direction is a direction pointing from the lower port to the upper port.

In an optional embodiment, a position with a largest curvature on the inner wall surface of the cup body is a first position; and
 in a normal direction of the substrate, a distance between the first position and the lower port is less than a distance between the first position and the upper port.

In an optional embodiment, the lower port and the upper port are both rectangular; the inner wall surface of the cup body includes two first sub wall surfaces disposed oppositely and two second sub wall surfaces disposed oppositely;
 wherein the two first sub wall surfaces are in a same shape and mirror symmetry, and the two second sub wall surfaces are in a same shape and mirror symmetry.

In an optional embodiment, an orthographic projection of the lower port on the substrate is located within a range of an orthographic projection of the upper port on the substrate; and/or
 a center of the orthographic projection of the lower port on the substrate overlaps with a center of the orthographic projection of the upper port on the substrate; and/or
 an orthographic projection of the inner wall surface of the cup body on the substrate is located within the range of the orthographic projection of the upper port on the substrate.

In an optional embodiment, the inner wall surface of the cup body includes a plurality of sub wall surfaces, and an angle between two adjacent sub wall surfaces is a chamfer.

In an optional embodiment, the plurality of reflector cups are arranged in an array; the upper ports of two adjacent reflector cups include a first upper port and a second upper port;
 wherein the first upper port has a first side edge close to the second upper port, the second upper port has a second side edge close to the first upper port, and the first side edge is parallel to the second side edge.

In an optional embodiment, a minimum distance between two adjacent upper ports is greater than or equal to 0.2 mm and less than or equal to 2 mm.

In an optional embodiment, in the normal direction of the substrate, a distance between the lower port and the upper port is greater than or equal to 10 mm and less than or equal to 30 mm.

The present disclosure provides a display device, including a display panel, and the backlight module according to any one of embodiments stated above, located at a backlight side of the display panel.

In an optional embodiment, the backlight module includes a plurality of backlight partitions, each backlight partition includes at least one light source, and the light sources located in the same backlight partition simultaneously emit light or do not emit light;
 the display device further includes a control module, a display driving module, and a backlight driving module;
 wherein the control module is connected to the display driving module and the backlight driving module respectively, and is configured to receive a display signal and generate, according to the display signal, backlight driving signals corresponding to the backlight partitions;

the backlight driving module is further connected to the backlight partitions, and is configured to drive, according to the backlight driving signals, the backlight partitions to emit light or not emit light; and the display driving module is further connected to the display panel, and is configured to drive, according to the display signal, the display panel to perform displaying.

The present disclosure provides driving method, applied to the display device according to embodiments stated above wherein the backlight module includes a plurality of backlight partitions; each backlight partition includes at least one light source; the light sources located in the same backlight partition simultaneously emit light or do not emit light; and the driving method includes:

receiving a display signal;

according to the display signal, generating backlight driving signals corresponding to the backlight partitions;

according to the backlight driving signals, driving the backlight partitions to emit light or not emit light;

according to the display signal, driving the display panel to perform displaying.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art may be briefly introduced below. Apparently, the figures that are described below are embodiments of the present disclosure, and a person skilled in the art can obtain other figures according to these figures without paying creative work. It should be noted that the proportions in the drawings are only indicative and do not represent actual proportions.

DETAILED DESCRIPTION

In order to make the objects, the technical solutions and the advantages of the embodiments of the present disclosure clearer, the technical solutions of the embodiments of the present disclosure may be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
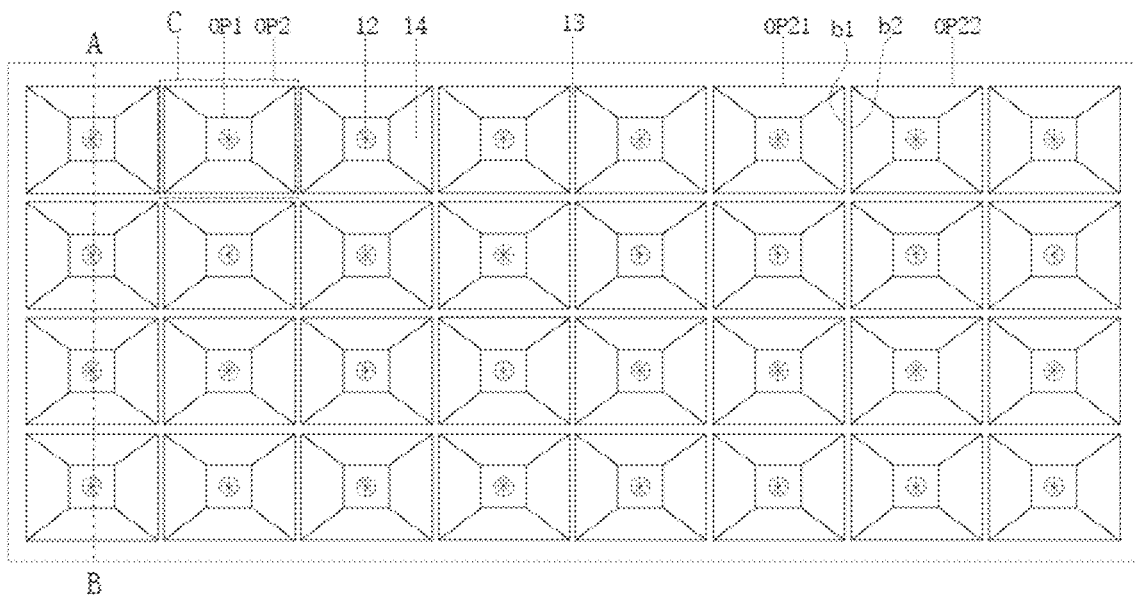
FIG. 1 schematically shows a schematic diagram of a plane structure of a backlight module provided by the present disclosure.

The present disclosure provides a backlight module. FIG. 1 schematically shows a schematic diagram of a plane structure of a backlight module provided by the present disclosure, and FIG. 2 schematically shows a schematic diagram of a sectional structure along a position of AB in FIG. 1.

Figure 2:
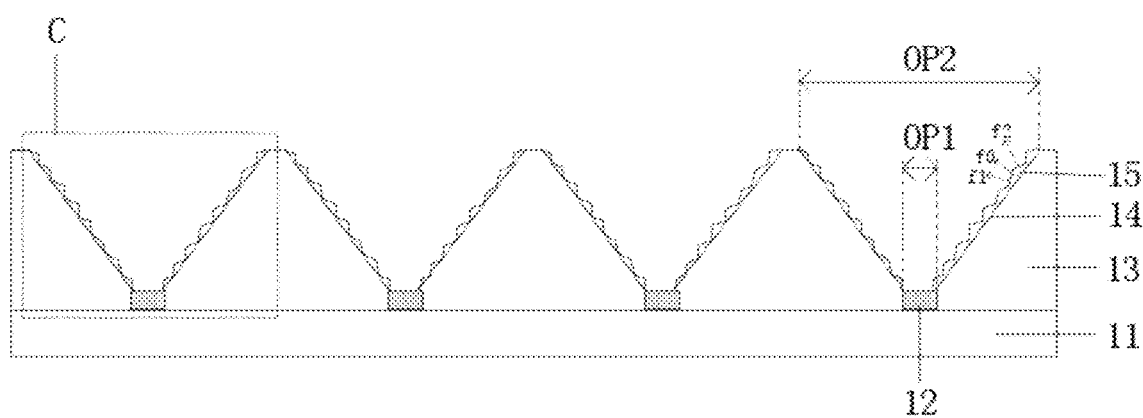
FIG. 2 schematically shows a schematic diagram of a sectional structure of a first kind of backlight module provided by the present disclosure.

As shown in FIG. 1 and FIG. 2, the backlight module includes a substrate 11, and a plurality of light sources 12 and a plurality of reflector cups C arranged at one side of the substrate 11.

Each reflector cup C includes a lower port OP1, an upper port OP2, a cup body 13 connected between the lower port OP1 and the upper port OP2, and a plurality of micro structures 15 arranged on an inner wall surface 14 of the cup body.

The plurality of light sources 12 are separately located at the lower ports OP1 of different reflector cups C, and light-emitting surfaces of the light sources 12 face the upper ports OP2.

As shown in FIG. 2, the micro structures 15 have a plurality of reflecting surfaces. The reflecting surfaces are configured for reflecting light emitted by the light sources 12. Normal directions (f1 and f2 as shown in FIG. 2) of at least two reflecting surfaces in the micro structures 15 and a normal direction (f0 as shown in FIG. 2) of the inner wall surface 14 of the cup body covered by the micro structures 15 are different from one another.

Among them, the inner wall surface 14 of the cup body is the surface of one side of the cup body 13 close to an internal space of the reflector cup C. The internal space is a space enclosed by the lower port OP1, the upper port OP2, and the inner wall surface 14 of the cup body.

Figure 3:
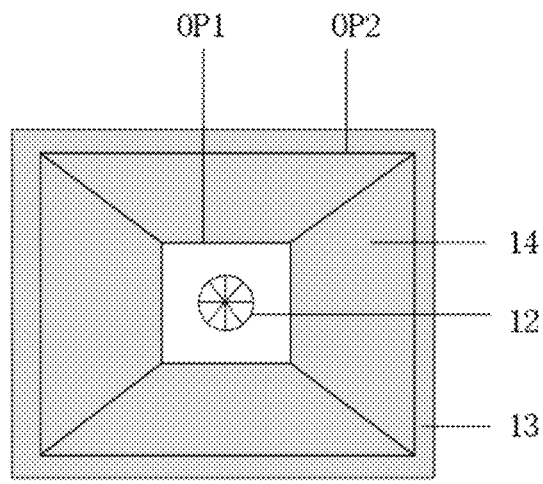
FIG. 3 schematically shows a schematic diagram of a plane structure of a reflector cup provided by the present disclosure.

FIG. 3 schematically shows a schematic diagram (micro structures are not shown) of a plane structure of a reflector cup C in the backlight module shown in FIG. 1.

In the present disclosure, the reflector cup C plays a role in collimating incident light. Light emitted by the light source 12 may be reflected by the inner wall surface 14 of the cup body. The light originally emitted from an oblique angle is deflected towards a positive angle after multiple reflections, ultimately causing a divergence angle of the light emitted from the upper port OP2 to be less than a divergence angle of the light emitted by the light source 12. When the backlight module provided in the present disclosure serves as a backlight source 12 of a display panel 121, the brightness of the display panel 121 in the positive perspective can be improved.

In addition, the plurality of micro structures 15 are arranged on the inner wall surface 14 of the cup body. The normal directions (f1 and f2 as shown in FIG. 2) of the at least two reflecting surfaces in the micro structures 15 and the normal direction (f0 as shown in FIG. 2) of the inner wall surface 14 of the cup body covered by the micro structures 15 are different from one another, that is, the normal directions f1, f2, and f0 shown in FIG. 2 are different from one another. In this way, a surface area of a reflecting surface can be enlarged, and orientations of the reflecting surface can be added. On the one hand, the incident light within a larger angle range can be collimated and modulated, thereby the brightness within a viewing angle range is improved. On the other hand, the angle uniformity of reflected light within the viewing angle range can be improved, thereby improving the brightness uniformity.

Figure 14A:
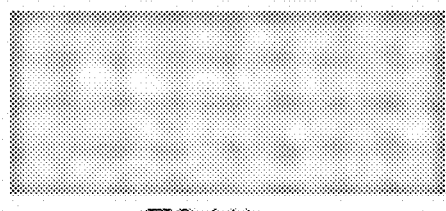
FIG. 14A and FIG. 14B schematically show brightness distribution simulated diagrams corresponding to backlight modules with and without micro structures.
Figure 14B:
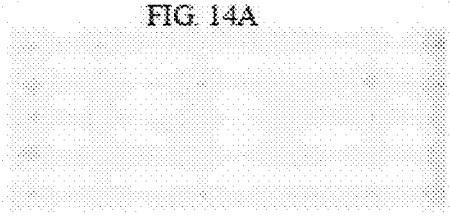

In order to compare the effects of the backlight modules with and without the micro structures, the backlight module with the micro structures and the backlight module without the micro structures are respectively simulated. Simulation results are as shown in FIG. 14A shows a display effect of the backlight module without the micro structures, and FIG. 14B shows a display effect of the backlight module with the micro structures. By comparison, it can be found that the backlight module with the micro structures has higher brightness uniformity.

Figure 4:
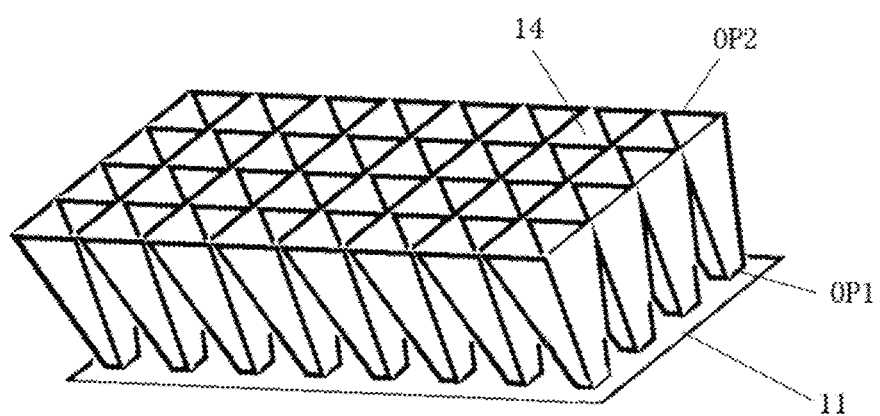
FIG. 4 schematically shows a schematic structural diagram of a backlight module in a first perspective provided by the present disclosure.
Figure 5:
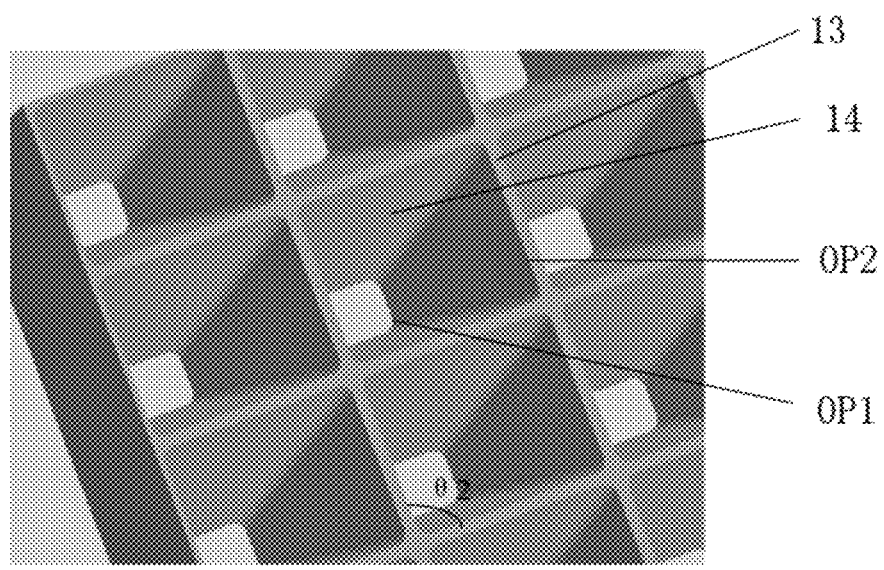
FIG. 5 schematically shows a schematic structural diagram of a backlight module in a second perspective provided by the present disclosure.

FIG. 4 and FIG. 5 schematically show schematic diagrams of structures of the backlight module shown in FIG. 1 in other two perspectives. For example, as shown in FIG. 1, FIG. 2, and FIG. 4 to FIG. 5, the plurality of reflector cups C can be arranged in an array on the substrate 11, and the plurality of reflector cups C can be of an integrated structure.

In some optional implementations, as shown in FIG. 1 to FIG. 3, an orthographic projection of the lower port OP1 on the substrate 11 is located within a range of an orthographic projection of the upper port OP2 on the substrate 11. A size of the lower port OP1 is less than a size of the upper port OP2, which can improve the emission efficiency.

In some optional implementations, as shown in FIG. 1 to FIG. 3, a center of the orthographic projection of the lower port OP1 on the substrate 11 overlaps with a center of the orthographic projection of the upper port OP2 on the substrate 11. The present disclosure does not limit this.

As shown in FIG. 1 to FIG. 5, the light sources 12 correspond to the reflector cups C in a one-to-one manner, and different light sources 12 are located in the lower ports OP1 of different reflector cups C. Each light source 12 may include, for example, one or more light emitting diode (LED) chips.

In specific implementation, the micro structures 15 are raised structures (as shown in FIG. 2) or sunken structures arranged on the inner wall surface 14 of the cup body. The present disclosure does not limit this.

In specific implementation, the specific structure of each micro structure 15 may be implemented in various forms.

Figure 6A:
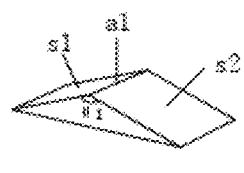
FIG. 6A to FIG. 6E schematically show schematic diagrams of several micro structures provided by the present disclosure.
Figure 6B:
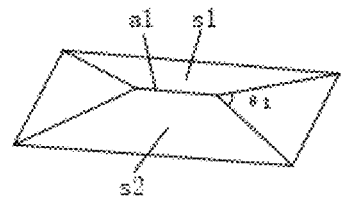

In some optional implementations, as shown in FIG. 6A and FIG. 6B, the plurality of reflecting surfaces in the micro structures include a first reflecting surface s1 and a second reflecting surface s2, and the first reflecting surface s1 and the second reflecting surface s2 share a same edge a1, that is, a shared edge a1. The shared edge a1 is an edge of the first reflecting surface s1 away from the inner wall surface 14 of the cup body, and the shared edge a1 is an edge of the second reflecting surface s2 away from the inner wall surface 14 of the cup body.

Figures 7, 8:
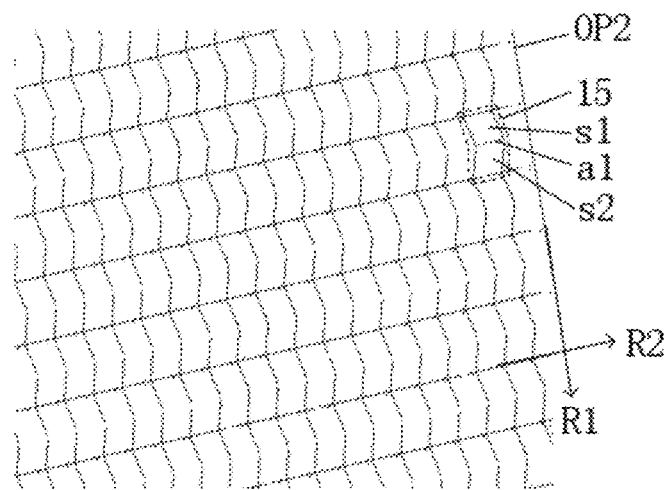
FIG. 7 schematically shows a schematic structural diagram of arrangement of a plurality of micro structures on an inner wall surface of a cup body.
FIG. 8 shows simulation results of brightness and uniformity corresponding to several angles.

FIG. 7 schematically shows a schematic structural diagram of arrangement of a plurality of micro structures on an inner wall surface of the cup body. The micro structures in FIG. 7 are as shown in FIG. 6A. The shared edge a1 is not in the plane where the inner wall surface 14 of the cup body is located, and does not have an intersection with the inner wall surface 14 of the cup body.

For example, as shown in FIG. 7, in each micro structure 15, the shared edge a1 of the first reflecting surface s1 and the second reflecting surface s2 is perpendicular to a boundary of the lower port OP1 or the upper port OP2. The boundary of the upper port OP2 is along a direction R1 as shown in FIG. 7, and an extending direction of the shared edge a1 of the first reflecting surface s1 and the second reflecting surface s2 is along a direction R2 as shown in FIG. 7.

Optionally, as shown in FIG. 6A and FIG. 6B, an angle θ1 between the first reflecting surface s1 and the second reflecting surface s2 is greater than or equal to 90° and less than 180°.

FIG. 8 shows simulation results of brightness and uniformity corresponding to different angles θ1. As shown in FIG. 8, within a range of 1400 to 170°, as the angle θ1 increases, the brightness and uniformity within the viewing angle range of the display panel correspondingly increase. When the angle θ1 is between 140° and 170°, the corresponding brightness reaches 1.4 million nits, and the corresponding uniformity reaches about 70%. When the angle θ1 is 170°, the corresponding brightness reaches 1.8 million nits, and the corresponding uniformity reaches 84%, which can greatly improve the display effect.

In specific implementation, the angle θ1 between the first reflecting surface s1 and the second reflecting surface s2 can be determined according to the difficulty of preparation and an actual effect. For example, the angle θ1 between the first reflecting surface s1 and the second reflecting surface s2 is 100°, 110°, 120°, 130°, 140°, 150°, 160°, 170°, or the like. The present disclosure does not limit this.

Optionally, a length of the shared edge a1 is greater than or equal to 0.2 mm and less than or equal to 2 mm. For example, the length of the shared edge a1 is 0.5 mm, 0.8 mm, or 1 mm.

Figure 6C:
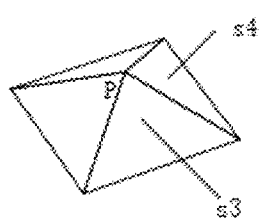

In some other optional implementations, as shown in FIG. 6C, the plurality of reflecting surfaces include a third reflecting surface s3 and a fourth reflecting surface s4, and the third reflecting surface s3 and the fourth reflecting surface s4 share a same vertex, that is, a shared vertex P. The shared vertex P is a vertex of the third reflecting surface s3 away from the inner wall surface 14 of the cup body, and the shared vertex P is a vertex of the fourth reflecting surface s4 away from the inner wall surface 14 of the cup body. The shared vertex P is not in the plane where the inner wall surface 14 of the cup body is located. The shared vertex P can also be a shared vertex P for three reflecting surfaces, four reflecting surfaces (as shown in FIG. e in-FIG. 6C), or even more reflecting surfaces.

Figure 6D:
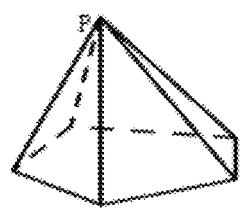
Figure 6E:
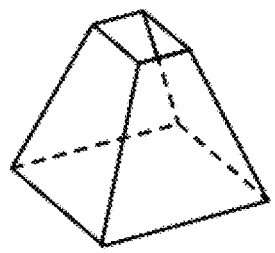

It should be noted that the micro structures 15 are not limited to the above mentioned structures. The micro structures 15 may also include multi-pyramid structures such as a pentagonal pyramid as shown in FIG. 6D, multi-prism-platform structures such as a four-prism-platform as shown in FIG. 6E, even a curved surface structure, and the like.

In specific implementation, the plurality of micro structures 15 can be arranged closely or arranged in an array on the inner wall surface 14 of the cup body, or closely arranged in an array (as shown in FIG. 7). The present disclosure does not limit this.

Closely arranging the plurality of micro structures 15 on the inner wall surface 14 of the cup body means that the plurality of micro structures 15 completely cover the inner wall surface 14 of the cup body.

In FIG. 7, the plurality of micro structures 15 are arranged in an array on the inner wall surface 14 of the cup body in a direction (the direction R1 as shown in FIG. 7) parallel to the lower port OP1 (or the upper port OP2) and a direction (the direction R2 as shown in FIG. 7) perpendicular to the lower port OP1 (or the upper port OP2).

In specific implementation, high-reflection films can also be arranged on the reflecting surfaces, which can further improve the reflection efficiency of the reflecting surfaces and reduce light loss. For example, the reflectivity of a high-reflection film to incident light may be greater than or equal to 90%.

Figure 9:
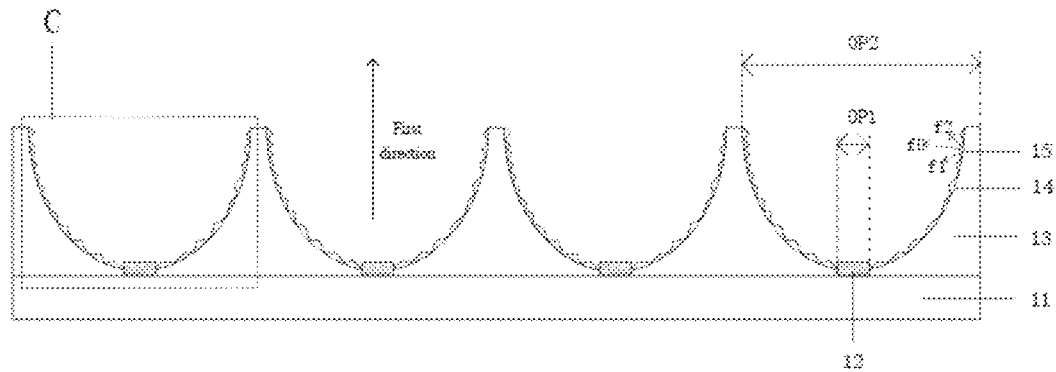
FIG. 9 schematically shows a schematic diagram of a sectional structure of a second kind of backlight module provided by the present disclosure.

In some optional implementations, the inner wall surface 14 of the cup body includes at least one of the following: a plane (as shown in FIG. 2), a polygonal surface, and a curved surface (as shown in FIG. 9).

Specifically, the inner wall surface 14 of the cup body may include a curved surface with a fixed or varying curvature, such as a paraboloid, a Bezier curved surface (as shown in FIG. 9), a cylindrical surface, a conical surface, or a spherical surface.

In some optional implementations, as shown in FIG. 9, the inner wall surface 14 of the cup body includes a curved surface, and a curvature of the curved surface gradually changes in a first direction. The first direction is a direction pointing from the lower port OP1 to the upper port OP2.

In a direction perpendicular to the first direction, the curvature of the curved surface can remain unchanged, that is, the curvatures at different positions at the same height can be the same, as shown in FIG. 9. Of course, the curvatures of the curved surfaces in the direction perpendicular to the first direction can also gradually change. The present disclosure does not limit this.

In some optional implementations, as shown in FIG. 9, the inner wall surface 14 of the cup body includes a curved surface protruding away from one side of the internal space of the reflector cup C, that is, the inner wall surface 14 of the cup body is an outwards convex surface, which can increase the number of reflections of light in the reflector cup C and further improve the brightness within a specific viewing angle range (such as the divergence angle of the light emitted from the upper port).

For example, as shown in FIG. 1, the lower port OP1 and the upper port OP2 of the reflector cup C are both rectangular, and long edges of the rectangular lower port OP1 and long edges of the rectangular upper port OP2 are parallel to each other, and orthographic projections of a center of the rectangular lower port OP1 and a center of the rectangular upper port OP2 on the substrate 11 overlap with each other. In this case, the inner wall surface 14 of the cup body includes four side surfaces.

When the four side surfaces of the inner wall surface 14 of the cup body are all planes, the shared edge a1 of the plurality of micro structures 15 arranged in the direction R2 as shown in FIG. 7 can be located on the same straight line.

When the four side surfaces of the inner wall surface 14 of the cup body are all curved surfaces, although the shared edge a1 of each micro structure is perpendicular to a boundary direction (the direction R1 as shown in FIG. 7) of the lower port OP1 or the upper port OP2, because the inner wall surface 14 of the cup body is the curved surface, the shared edges a1 of the plurality of micro structures 15 arranged in the direction R2 shown in FIG. 7 are not located on the same straight line.

Figure 10:
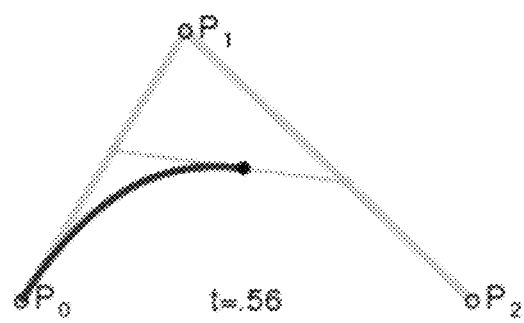
FIG. 10 shows a schematic diagram of simulation of generation of a Bezier curved surface.

In specific implementation, the shape of the inner wall surface 14 of the cup body can be designed using optical simulation software such as Light-Tools according to actual needs. The inventor uses Light-Tools to design the reflector cup C, and a smooth curve is generated according to the second-order Bezier curve formula. The second-order Bezier curve formula is:

$$B(t) = (1-t)^2 P_0 + 2t(1-t)P_1 + t^2 P_2, t \in [0, 1]$$

wherein P0, P1, and P2 represent three fixed points, and t represents a continuous control point between the three fixed points, as shown in FIG. 10. According to the above Bezier curve formula, the inner wall surface 14 of the cup body can be generated through a few control points. The inner wall surface 14 of the cup body includes four curved surfaces with varying curvatures, namely Bezier curved surfaces.

For example, as shown in FIG. 9, a size of the rectangular lower port OP1 is 2.6 mm×2.2 mm, and a size of the rectangular upper port OP2 is 8.55 mm×7.26 mm. The plurality of reflector cups C are arranged in an array along the long and short edges of the rectangles, and there are 32 reflector cups C (an 8×4 array as shown in FIG. 1). An overall boundary dimension of the backlight module is 68.4 mm×29.04 mm×20 mm, and the brightness of each light source 12 is 35 lumens. The above backlight module parameters are used for simulation, and simulation results show that the divergence angle of the light emitted by the light source 12 after the light is collimated by the reflector cup C is less than 25°×18°. A thickness (namely, a distance between a surface of one side of the substrate 11 facing away from the light source 12 and the display panel 121 in FIG. 12) of the backlight module used for simulation is 40 mm.

In some optional implementations, a position with a largest curvature on the inner wall surface 14 of the cup body is a first position; and in a normal direction of the substrate 11, a distance between the first position and the lower port OP1 is less than a distance between the first position and the upper port OP2. That is, in the normal direction of the substrate 11, the position with the largest curvature on the inner wall surface 14 of the cup body is closer to the lower port OP1.

In some optional implementations, as shown in FIG. 1, the lower port OP1 and the upper port OP2 are both rectangular. In this way, the upper ports OP2 may be closely arranged, to reduce an area occupied by walls of the reflector cups C, reduce a dark area, maximize an area covered by the upper ports OP2, and further improve the brightness and brightness uniformity within the viewing angle range.

When the lower port OP1 and the upper port OP2 are both rectangular, the inner wall surface 14 of the cup body includes two first sub wall surfaces disposed oppositely and two second sub wall surfaces disposed oppositely. The two first sub wall surfaces are in a same shape and mirror symmetry, and the two second sub wall surfaces are in a same shape and mirror symmetry.

In some optional implementations, an orthographic projection of the inner wall surface 14 of the cup body on the substrate 11 is located within the range of the orthographic projection of the upper port OP2 on the substrate 11. A size of a protrusion of the inner wall surface 14 of the cup body cannot exceed a coverage range of the upper port OP2.

In some optional implementations, referring to FIG. 5, the inner wall surface 14 of the cup body includes a plurality of sub wall surfaces, and an angle θ2 between two adjacent sub wall surfaces is a chamfer. The chamfer may be either oblique or round. By setting a chamfer between two adjacent sub wall surfaces, the processing difficulty of the reflector cups C can be reduced.

In FIG. 5, since the lower port OP1 and the upper port OP2 are rectangular, the inner wall surface 14 of the cup body includes four sub wall surfaces, and the angle θ2 between any two adjacent sub wall surfaces is a chamfer. In FIG. 5, the angle θ2 between two adjacent sub wall surfaces is a round chamfer with a radius of 0.5 mm.

In some optional implementations, as shown in FIG. 1, the plurality of reflector cups C are arranged in an array, and the upper ports OP2 of two adjacent reflector cups C include a first upper port OP21 and a second upper port OP22.

The first upper port OP21 has a first side edge b1 close to the second upper port OP22, and the second upper port OP22 has a second side edge b2 close to the first upper port OP21. The first side edge b1 is parallel to the second side edge b2.

In FIG. 1, a length of the first side edge b1 is equal to a length of the second side edge b2.

In some optional implementations, in the normal direction of the substrate 11, a distance (a height of the reflector cup) between the lower port OP1 and the upper port OP2 is greater than or equal to 10 mm and less than or equal to 30 mm.

Figure 11:
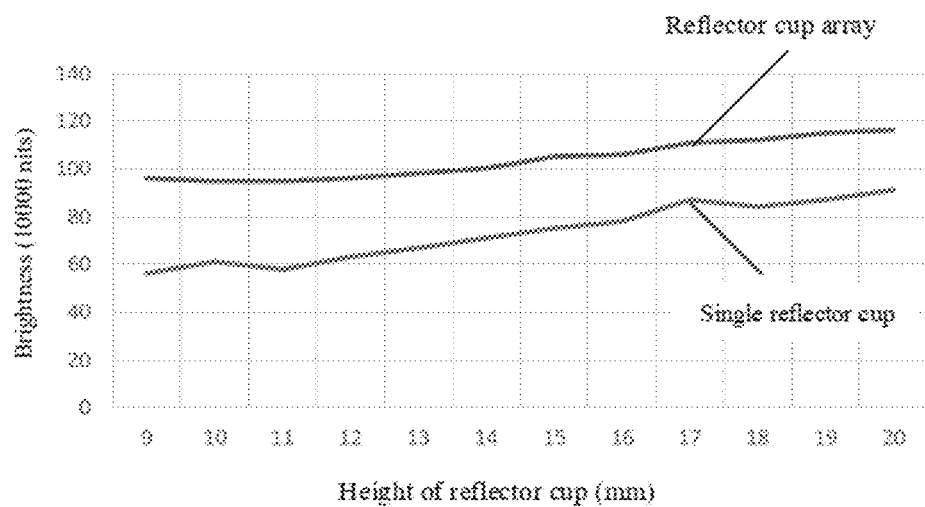
FIG. 11 shows a curve in which brightness changes with a height of a reflector cup.

FIG. 11 shows brightness values corresponding to heights of different reflector cups. It can be seen that within a range from 9 mm to 20 mm, as the heights of the reflector cups increase, the brightness also correspondingly increases. However, as the heights of the reflector cups increase, the processing difficulty of the reflector cups C increases. In specific implementation, the heights of the reflector cups C can be determined according to the processing difficulty and an actual effect.

For example, in the normal direction of the substrate 11, the distance between the lower port OP1 and the upper port OP2 may be 15 mm, 18 mm, 20 mm, 22 mm, 25 mm, or the like.

In some optional implementations, a minimum distance (namely, a wall thickness of the reflector cup C, such as a distance between the first side edge b1 and the second side edge b2 in FIG. 1) between two adjacent upper ports OP2 is greater than or equal to 0.2 mm and less than or equal to 2 mm.

For example, the minimum distance between two adjacent upper ports OP2 may be 0.5 mm, 0.8 mm, 1 mm, or the like. The disclosure does not limit this.

Figure 12:
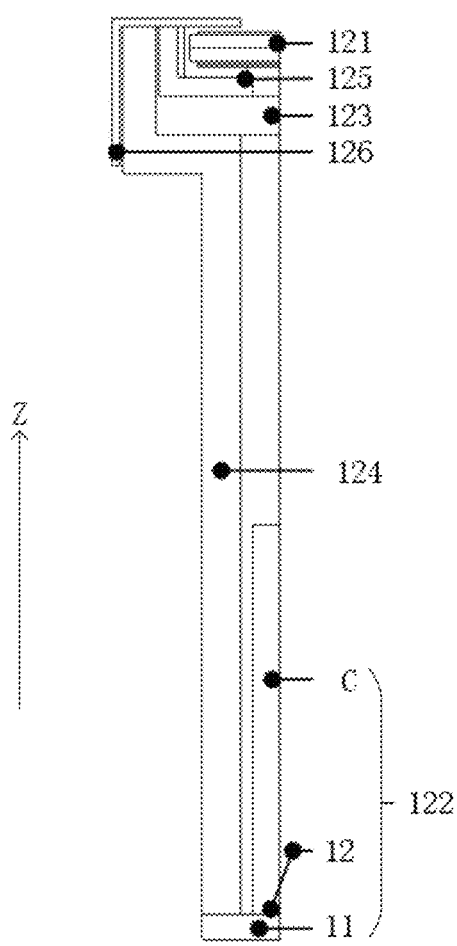
FIG. 12 schematically shows a schematic structural diagram of a display device provided by the present disclosure.

The present disclosure further provides a display device. As shown in FIG. 12, the display device includes a display panel 121, and the backlight module 122 as provided in any implementation, which is located at a backlight side of the display panel 121.

Those skilled in the art can understand that the display device has the advantages of the aforementioned backlight module 122.

Optionally, as shown in FIG. 12, the display device may also include a diffusion sheet 123, arranged at one side of each reflector cup C away from the substrate 11 and located between a light exiting surface of the backlight module 122 and a light entering surface of the display panel 121. The diffusion sheet 123 can further improve the brightness uniformity within a viewing angle range of the display panel.

As shown in FIG. 12, the backlight module 122 in the display device is similar to a structure of a direct type backlight module, but in a normal direction of the display panel 121, a thickness of the backlight module 122 is greater than a thickness of the traditional direct type backlight module.

As shown in FIG. 12, the display device may further include a backplane 124, an inner rubber frame 125, and a frame 126. A lower side of the backplane 124 is fixed to the substrate 11, and the side of the substrate 11 away from the reflector cup C may be bonded with a heat dissipation tape, heat dissipation silicone or a heat dissipation sheet to assist in heat dissipation. The backplane 124, the reflector cup C, and the light source 12 are located at the same side of the substrate 11, and the reflector cup C, the substrate 11, and the backplane 124 are fixed together. A step is arranged on an inner wall of the backplane 124 between the reflector cup C and the display panel 121 to place the diffusion sheet 123. The inner rubber frame 125 is arranged between the diffusion sheet 123 and the display panel 121. The diffusion sheet 123 and the inner rubber frame 125 can be in direct contact in a Z direction as shown in the figure, or can be separately arranged (for example, there may be a clearance of 20 mm between the diffusion sheet 123 and the inner rubber frame 125). The inner rubber frame 125 may be fixed to a side wall of the backplane 124 through a clip or a tape, and a step may also be arranged on the side wall of the backplane 124 to assist in fixing the inner rubber frame 125. A circle of foam may be bonded between the inner rubber frame 125 and the display panel 121 as required. The display panel 121 is fixed between the frame 126 and the inner rubber frame 125. The frame 126 may be fixed to the backplane 124 or the inner rubber frame 125 through a clip or a tape.

The display panel 121 may be a liquid crystal display (LCD). The display device provided by the present disclosure is not required to be provided with various laminated structures, such as reflector plates, light guiding plates, and prismatic lenses and other optical lenses, required for conventional backlight sources, which can simplify the difficulty of module assembling.

The display device provided by the present disclosure may be a display or a product containing a display.

The display may be a flat panel display (FPD), a micro display, and the like. According to a scene of whether a user can see a back surface of a display, the display may be transparent or not transparent. According to whether a display can be bent or curled, the display may be a flexible display or an ordinary display (which may be referred to as a rigid display).

For example, the display device may include: a computer, a television set, an advertising board, a laser printer with a display function, a telephone, a mobile phone, electronic paper, a personal digital assistant (PDA), a laptop, a digital camera, a tablet, a notebook, a navigator, a portable camera, a viewfinder, a large-area walls, a screen in a theater, a stadium signage, or the like.

For example, the display device may include a head up display (HUD), an augmented reality head up display (AR-HUD), and other sets of vehicle-mounted display equipment.

Figure 15:
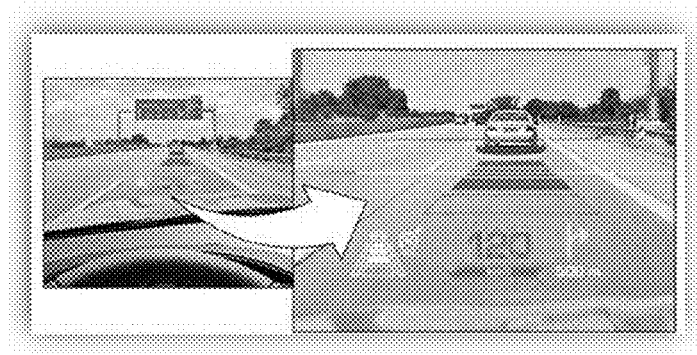
FIG. 15 schematically shows a schematic diagram of a first display effect of an augmented reality head up display device in the related art.

The AR-HUD is a set of vehicle-mounted visual assistance equipment that uses an augmented reality technology to reasonably overlay and display information such as a vehicle speed, navigation, and a status of a driving assistance system within a field of view of a driver, as shown in FIG. 15. The AR-HUD, as a set of novel vehicle-mounted visual interaction equipment, has a good assistance effect in reducing visual distraction and action distraction of a driver when the driver reads vehicle-mounted information. Drivers place higher requirements on the brightness and contrast of the AR-HUD during daily driving.

Figure 16:
FIG. 16 schematically shows a schematic diagram of another display effect of an augmented reality head up display device in the related art.

FIG. 16 schematically shows a diagram of a display effect of a head up display device using a traditional backlight module. The display device has a postcard effect during night projected display.

Figure 13:
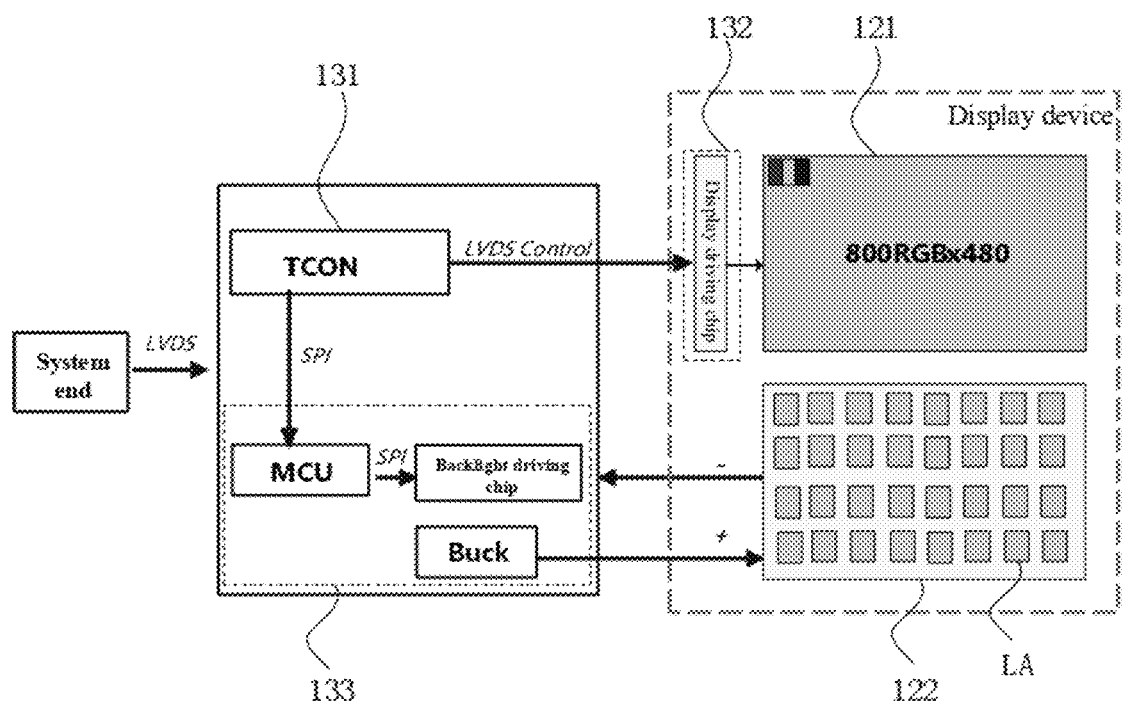
FIG. 13 schematically shows a schematic diagram of a driving structure of a display device provided by the present disclosure.

In some optional implementations, referring to FIG. 13, the backlight module 122 includes a plurality of backlight partitions LA; each backlight partition LA includes at least one light source; and the light sources located in the same backlight partition LA simultaneously emit light or do not emit light.

In specific implementation, each backlight partition LA may include one or more light sources, and each backlight partition may be independently driven to cause light sources located in the same backlight partition to simultaneously emit light or not emit light, thereby achieving local dimming and achieving high dynamic range imaging (HDR). Due to the local dimming, a light emission state of each backlight partition can be adjusted according to the brightness of a displayed image on the display panel, so that the brightness of a backlight partition corresponding to a highlighted portion of the displayed image is maximized, and at the same time, the brightness of a backlight partition corresponding to a dark portion of the displayed image is reduced, to achieve an optimal contrast. This can improve the emission efficiency of the light sources and the image contrast based on reducing the backlight power consumption.

When each backlight partition may include one light source, the precision of the local dimming can be maximized. For example, the entire backlight module shown in FIG. 1 may be divided into 32 backlight partitions, including eight transverse backlight partitions and four longitudinal backlight partitions. Each backlight partition includes one light source 12.

In some optional embodiments, as shown in FIG. 13, the display device further includes a control module 131, a display driving module 132, and a backlight driving module 133.

The control module 131 is connected to the display driving module 132 and the backlight driving module 133 respectively, and is configured to receive a display signal LVDS and generate, according to the display signal LVDS, backlight driving signals corresponding to the backlight partitions LA.

The backlight driving module 133 is also connected to the backlight partitions LA, and is configured to drive, according to the backlight driving signals, the backlight partitions LA to emit light or not emit light.

The display driving module 132 is also connected to the display panel 121, and is configured to drive, according to the display signal, the display panel 121 to perform displaying.

The backlight driving module 133 may include one or more backlight drive chips. Each backlight drive chip may be connected to one backlight partition LA. In this case, the backlight driving module 133 includes a plurality of backlight drive chips. Each backlight drive chip may also be connected to a plurality of backlight partitions LAs. In this case, the backlight drive chip may control light emission states of the plurality of backlight partitions LAs connected to the backlight drive chip in a time-sharing manner.

As shown in FIG. 13, a resolution of the display panel 121 is 800×480 pixels. Each pixel includes three sub-pixels, namely a red sub-pixel R, a green sub-pixel G, and a blue sub-pixel B.

In a process of driving the display device to perform displaying, a system end first provides the display signal LVDS to the control module 131. The control module 131 generates the backlight driving signals corresponding to the backlight partitions LA according to a pre-stored local dimming processing algorithm and the received display signal LVDS. Afterwards, the control module 131 sends the display signal LVDS to the display driving module 132, and the display drive chips in the display driving module 132 drive the display panel 121 to display a picture according to the display signal LVDS.

The control module 131 sends the backlight driving signals to the backlight driving module 133 through a serial peripheral interface (SPI). The backlight driving module 133 includes a micro control unit (MCU) and a backlight drive chip. The MCU performs secondary processing on the received backlight driving signal, and then sends the processed backlight driving signal to the backlight drive chip. The backlight drive chip outputs corresponding currents to the backlight partitions LA, causing the backlight partitions LA to emit brightness that matches displayed pictures at corresponding positions, thereby achieving local dimming driving.

The local dimming technology is used to drive the backlight module provided in the present disclosure, the brightness and contrast of the displayed pictures can be improved. When the backlight module is applied to the head up display device, the experience of a vehicle owner using the HUD can be effectively improved, and the postcard effect in night projected display can be avoided.

The present disclosure further provides a driving method, applied to a display device provided in any one of the above implementations. As shown in FIG. 12 and FIG. 13, the display device includes a display panel 121, and a backlight module 122 as provided in any one of the implementations, which is located at a backlight side of the display panel 121. The backlight module 122 includes a plurality of backlight partitions LA, each of the backlight partitions LA includes at least one light source 12. The light sources 12 located in the same backlight partition LA simultaneously emit light or do not emit light.

The driving method includes the following steps:

Step S01: receiving a display signal.

Step S02: according to the backlight driving signals, driving the backlight partitions LA to emit light or not emit light.

Step S03: according to the backlight driving signals, driving the backlight partitions LA to emit light or not emit light.

Step S04: according to the display signal, driving the display panel 12 to perform displaying.

In specific implementation, referring to FIG. 13, the control module 131 receives a display signal and generates, according to the display signal, backlight driving signals corresponding to the backlight partitions LA. The backlight driving module 133 drives, according to the backlight driving signals, the backlight partitions LA to emit light or not emit light. The display driving module 132 drives, according to the display signal, the display panel 121 to perform displaying.

The driving method provided by the present disclosure has been described in detail in the specific implementations of the display device, and will not be explained in detail here.

In the present disclosure, the meaning of "a plurality of" is two or more, and the meaning of "at least one" is one or more, unless otherwise specifically defined.

In the present disclosure, an orientation or positional relationship indicated by the terms "upper" and "lower" is based on orientation or positional relationships shown in the drawings, and are merely for convenience of describing the present disclosure and simplifying the description, rather than indicate or imply that the device or element referred to must have a specific orientation, be configured and operated in a specific orientation, and thus cannot be understood as a limitation on the present disclosure.

In the claims, any reference signs between parentheses should not be construed as limiting the claims.

Relational terms herein such as first and second, etc., are used merely to distinguish one entity or operation from another entity or operation, and do not necessarily require or imply there is any such relationship or order between these entities or operations. Furthermore, the terms "including", "including" or any variations thereof are intended to embrace a non-exclusive inclusion, such that a process, method, article, or terminal device including a plurality of elements includes not only those elements but also includes other elements not expressly listed, or also incudes elements inherent to such a process, method, article, or device. In the absence of further limitation, an element defined by the phrase "including a . . . " does not exclude the presence of additional identical element in the process, method, article, or terminal device.

The backlight module, and the display device and the driving method thereof provided by the present disclosure are described in detail above. Specific examples are applied to explain the principle and implementation of the present disclosure herein. The above embodiments are only used to help understand the method of the present disclosure and the core idea thereof.

The various embodiments in this specification are described in a progressive manner. Each embodiment focuses on the differences from the other embodiments, and the same or similar parts between the various embodiments may be referred to each other.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

The present disclosure is intended to cover any variations, uses, or adaptive changes of the present disclosure. These variations, uses, or adaptive changes follow the general principles of the present disclosure and include common general knowledge or conventional technical means in the technical field, which are not disclosed herein. The specification and the embodiments are considered as being exemplary only, with a true scope and spirit of the present disclosure being indicated by the following claims.

The invention claimed is:

1. A backlight module, comprising a substrate and a plurality of light sources and a plurality of reflector cups arranged at one side of the substrate, wherein
   each reflector cup comprises a lower port, an upper port, a cup body connected between the lower port and the upper port, and a plurality of micro structures arranged on an inner wall surface of the cup body,
   the plurality of light sources are separately located at the lower ports of different reflector cups, and light-emitting surfaces of the light sources face the upper ports,
   the micro structures have a plurality of reflecting surfaces, the reflecting surfaces are configured for reflecting light emitted by the light sources, and normal directions of at least two reflecting surfaces in the micro structures and a normal direction of the inner wall surface of the cup body covered by the micro structures are different from one another,
   the inner wall surface of the cup body comprises a curved surface protruding away from one side of an internal space of the reflector cup; a curvature of the curved surface sequentially changes in a first direction; and the first direction is a direction pointing from the lower port pointing to the upper port,
   a position with a largest curvature on the inner wall surface of the cup body is a first position, and
   in a normal direction of the substrate, a distance between the first position and the lower port is less than a distance between the first position and the upper port.

2. The backlight module according to claim 1, wherein the plurality of reflecting surfaces comprise a first reflecting surface and a second reflecting surface; the first reflecting surface and the second reflecting surface share a same edge; and the same edge is an edge of the first reflecting surface and the second reflecting surface away from the inner wall surface of the cup body.

3. The backlight module according to claim 2, wherein the same edge is perpendicular to a boundary of the lower port or the upper port.

4. The backlight module according to claim 2, wherein an angle between the first reflecting surface and the second reflecting surface is greater than or equal to 90° and less than 180°; and/or, a length of the same edge is greater than or equal to 0.2 mm and less than or equal to 2 mm.

5. The backlight module according to claim 1, wherein the plurality of reflecting surfaces comprise a third reflecting surface and a fourth reflecting surface; the third reflecting surface and the fourth reflecting surface share a same vertex;

and the same vertex is a vertex of the third reflecting surface and the fourth reflecting surface away from the inner wall surface of the cup body.

6. The backlight module according to claim 1, wherein the micro structures are raised structures or sunken structures arranged on the inner wall surface of the cup body.

7. The backlight module according to claim 1, wherein the plurality of micro structures are arranged closely and/or are arranged in an array on the inner wall surface of the cup body.

8. The backlight module according to claim 1, wherein the lower port and the upper port are both rectangular; the inner wall surface of the cup body comprises two first sub wall surfaces disposed oppositely and two second sub wall surfaces disposed oppositely;
   wherein the two first sub wall surfaces are in a same shape and mirror symmetry, and the two second sub wall surfaces are in a same shape and mirror symmetry.

9. The backlight module according to claim 1, wherein an orthographic projection of the lower port on the substrate is located within a range of an orthographic projection of the upper port on the substrate; and/or
   a center of the orthographic projection of the lower port on the substrate overlaps with a center of the orthographic projection of the upper port on the substrate; and/or
   an orthographic projection of the inner wall surface of the cup body on the substrate is located within the range of the orthographic projection of the upper port on the substrate.

10. The backlight module according to claim 1, wherein the inner wall surface of the cup body comprises a plurality of sub wall surfaces, and an angle between two adjacent sub wall surfaces is a chamfer.

11. The backlight module according to claim 1, wherein the plurality of reflector cups are arranged in an array; the upper ports of two adjacent reflector cups comprise a first upper port and a second upper port;
   wherein the first upper port has a first side edge close to the second upper port, the second upper port has a second side edge close to the first upper port, and the first side edge is parallel to the second side edge.

12. The backlight module according to claim 1, wherein a minimum distance between two adjacent upper ports is greater than or equal to 0.2 mm and less than or equal to 2 mm.

13. The backlight module according to claim 1, wherein in the normal direction of the substrate, a distance between the lower port and the upper port is greater than or equal to 10 mm and less than or equal to 30 mm.

14. A display device, comprising a display panel, and the backlight module according to claim 1, located at a backlight side of the display panel.

15. The display device according to claim 14, wherein the backlight module comprises a plurality of backlight partitions, each backlight partition comprises at least one light source, and the light sources located in the same backlight partition simultaneously emit light or do not emit light;
   the display device further comprises a control module, a display driving module, and a backlight driving module;
   wherein the control module is connected to the display driving module and the backlight driving module respectively, and is configured to receive a display signal and generate, according to the display signal, backlight driving signals corresponding to the backlight partitions;
   the backlight driving module is further connected to the backlight partitions, and is configured to drive, according to the backlight driving signals, the backlight partitions to emit light or not emit light; and
   the display driving module is further connected to the display panel, and is configured to drive, according to the display signal, the display panel to perform displaying.

16. A driving method, applied to the display device according to claim 14, wherein the backlight module comprises a plurality of backlight partitions; each backlight partition comprises at least one light source; the light sources located in the same backlight partition simultaneously emit light or do not emit light; and the driving method comprises:
   receiving a display signal;
   according to the display signal, generating backlight driving signals corresponding to the backlight partitions;
   according to the backlight driving signals, driving the backlight partitions to emit light or not emit light;
   according to the display signal, driving the display panel to perform displaying.

* * * * *